United States Patent
Höhn

(10) Patent No.: US 7,952,311 B2
(45) Date of Patent: May 31, 2011

(54) METHOD AND APPARATUS FOR VARIATION OF A RATED CURRENT

(75) Inventor: Ulrich Höhn, Hollstadt/Junkershausen (DE)

(73) Assignee: Siemens Aktiengesellschaft, Munich (DE)

( * ) Notice: Subject to any disclaimer, the term of this patent is extended or adjusted under 35 U.S.C. 154(b) by 371 days.

(21) Appl. No.: 11/720,163

(22) PCT Filed: Nov. 21, 2005

(86) PCT No.: PCT/EP2005/056124
§ 371 (c)(1),
(2), (4) Date: Jul. 28, 2009

(87) PCT Pub. No.: WO2006/056565
PCT Pub. Date: Jun. 1, 2006

(65) Prior Publication Data
US 2009/0295320 A1 Dec. 3, 2009

(30) Foreign Application Priority Data
Nov. 25, 2004 (DE) .......... 10 2004 056 998

(51) Int. Cl.
*H02P 7/18* (2006.01)
*G05D 23/20* (2006.01)

(52) U.S. Cl. .............. 318/434; 318/471; 318/400.02; 361/29

(58) Field of Classification Search .......... 318/434, 318/471, 400.02, 801; 700/299; 361/29
See application file for complete search history.

(56) References Cited

U.S. PATENT DOCUMENTS

| | | | | |
|---|---|---|---|---|
| 6,984,948 B2 * | 1/2006 | Nakata et al. | ............ | 318/400.02 |
| 7,265,954 B2 * | 9/2007 | Hikawa et al. | ................ | 361/29 |
| 2004/0124807 A1 * | 7/2004 | Nakata et al. | ................ | 318/801 |
| 2007/0070560 A1 * | 3/2007 | Hikawa et al. | ................ | 361/29 |
| 2009/0322262 A1 * | 12/2009 | Tobari et al. | ............ | 318/400.02 |
| 2010/0327837 A1 * | 12/2010 | Tsugawa et al. | ............ | 323/285 |

FOREIGN PATENT DOCUMENTS

| | | |
|---|---|---|
| DE | 41 38 066 A1 | 3/1992 |
| DE | 299 13 196 U1 | 1/2001 |
| DE | 100 49 506 A1 | 4/2001 |
| EP | 1 419 952 A2 | 5/2004 |
| JP | 4 021386 A | 1/1992 |
| JP | 11 018496 | 1/1999 |
| JP | 2004-297957 A | 10/2004 |
| WO | WO 2004/001950 A1 | 12/2003 |

* cited by examiner

*Primary Examiner* — Paul Ip
(74) *Attorney, Agent, or Firm* — Henry M. Feiereisen; Ursula B. Day

(57) ABSTRACT

The invention relates to a method for variation of a rated current which is specific of a motor by providing a rated current basic value signal (2) depending on a rated current basic value of the motor $I_{rated}$, and by detecting an actual temperature $T_{act}$, providing a corresponding temperature signal (4), determining an actual rated current $I_{act}$ depending on the rated current basic value signal (2) and the temperature signal (4), and providing a corresponding rated current signal (6). Additionally, the inventive method allows to determine the actual rated current depending on the speed of the motor. The invention also relates to a device for varying the rated current of a motor depending on a temperature and optionally depending on a speed of the motor. The inventive device can be used in a measuring system for determining the utilization rate and for monitoring the temperature of a motor.

10 Claims, 2 Drawing Sheets

METHOD AND APPARATUS FOR VARIATION OF A RATED CURRENT

BACKGROUND OF THE INVENTION

The present invention describes a method for variation of a rated current which is specific for a motor, by provision of a rated-current basic-value signal as a function of a rated-current basic value $I_{rated}$ of the motor. It is also intended to provide a corresponding apparatus for variation of a rated current.

During operation of a motor, energy is converted to heat via the electrical losses resulting from the current (copper losses) and the magnetization changes in the motor (iron losses), as well as the friction that occurs. If the amount of energy converted is greater than the amount of thermal energy which is passed to the environment, then there is a risk of the motor overheating. Attempts to prevent thermal destruction of a motor by means of a warning system having one or more sensors have shown that this method does not ensure adequate protection. In this case, even the fitting of one or more sensors to the winding of a motor has been found to be problematic.

According to the prior art, a method is therefore offered that is known by the name $I^2t$ monitoring. In this case, a current level which is referred to as the rated current or S1 current is defined for a motor, representing the highest value of the motor current level at which the motor can still be operated indefinitely without any need to be concerned about overheating of the motor.

If the rated current $I_{rated}$ of a motor is known, then the load level $X_{con}$ on the motor when the motor is loaded for a relatively long time with an undefined, constant motor current level $I_{con}$ can be calculated using the following equation, Equation 1:

$$X_{con} = \frac{I_{con}^2}{I_{rated}^2} \qquad \text{(Equation 1)}$$

If the current level changes from the value $I_2$ to the value $I_2$ at the time t=0, then the thermal time constant $\tau_{th}$ of the motor must also be taken into account in the calculation of the load level X(t) of the motor at the time t≠0. This is done using the following formula:

$$X(t) = \frac{I_2^2}{I_{rated}^2} - \left(\frac{I_2^2}{I_{rated}^2} - \frac{I_1^2}{I_{rated}^2}\right) \cdot e^{\frac{t}{\tau_{th}}} \qquad \text{(Equation 2)}$$

For an approximation to the abovementioned equation 2, the series development of the exponential function is truncated after the second term. Equation 2 then becomes:

$$X(t) \approx \frac{I_1^2}{I_{rated}^2} - \left(\frac{I_2^2}{I_{rated}^2} - \frac{I_1^2}{I_{rated}^2}\right) \cdot \frac{t}{\tau_{th}} \qquad \text{(Equation 3)}$$

If the load level $X_{con}$ or X(t) reaches a value of 100%, then remedial measures must be taken in order to avoid overheating of the motor. This is done, for example, by emission of a warning to a motor user, by automatically shutting down the motor, or by automatically reducing the motor current level to, for example, 90% of $I_{rated}$.

However, the method described here for calculation of the load level on a motor according to the prior art offers only inadequate protection against overheating of a motor since this calculation of the load level on the motor does not take account of environmental influences.

SUMMARY OF THE INVENTION

The object of the present invention is to develop a method which allows the load level on a motor to be determined better.

According to the invention, the object is achieved by a method for variation of a rated current which is specific for a motor, by provision of a rated-current basic-value signal as a function of a rated-current basic value $I_{rated}$ of the motor, and by recording of an actual temperature $T_{act}$, provision of a corresponding temperature signal, determination of an actual rated current $I_{act}$ as a function of the rated-current basic-value signal and of the temperature signal, and provision of a corresponding rated-current signal.

Furthermore, an apparatus is provided according to the invention for variation of a rated current which is specific for a motor, comprising an output device for provision of a rated-current basic-value signal as a function of a rated-current basic value $I_{rated}$ of the motor, comprising a sensor device for recording of an actual temperature $T_{act}$ and for provision of a corresponding temperature signal, and an evaluation device whose input side is coupled to an output of the output device and to an output of the sensor device, for supplying the rated-current basic-value signal and the temperature signal, in order to determine an actual rated current $I_{act}$ as a function of the rated-current basic-value signal and the temperature signal and for provision of a corresponding rated-current signal.

The discovery that the rated current of a motor is dependent on the ambient temperature in which the motor is operating is the basis of the invention. If the rated current is matched to the ambient temperature, then the newly determined rated current value can also be used to calculate a more appropriate value for the load level on a motor.

A temperature within the housing or a housing temperature of the motor is advantageously recorded as the actual temperature $T_{act}$. The temperature sensor is for this purpose fitted in the motor housing, and not on the motor winding. This saves costs and allows simple repair in the event of functional failure of the temperature sensor. As an alternative to this, the attachment for the temperature sensor can also be chosen, however, on the basis of the type of cooling (water, air, etc.) such that the area directly surrounding the winding is recorded well.

If the rated-current basic value $I_{rated}$ is defined for a specific rated-current temperature $T_{rated}$, then the actual rated current $I_{act}$ can be determined as a function of the rated-current temperature $T_{rated}$. Depending on the type of motor, the actual temperature $T_{act}$ can be recorded at the same measurement point as the rated-current temperature $T_{rated}$. This ensures that an appropriate actual rated current $I_{act}$ is also determined by means of the rated-current temperature $T_{rated}$ and the actual temperature $T_{act}$.

The actual rated current $I_{act}$ is preferably determined from the rated-current basic value $I_{rated}$, the actual temperature $T_{act}$, the rated-current temperature $T_{rated}$, the maximum permissible ambient temperature or coolant temperature $T_{ZMU}$ that is still permissible, and from a correction factor C for the temperature influence using the following equations 4 to 6:

$$\vartheta_{rated} = T_{rated} - T_{ZMU} \quad \text{(Equation 4)}$$

$$\vartheta_{act} = T_{act} - T_{ZMU} \quad \text{(Equation 5)}$$

$$I_{act} = I_{rated}\sqrt{1 + C\frac{\vartheta_{rated} - \vartheta_{act}}{\vartheta_{rated}}} \quad \text{(Equation 6)}$$

This ensures that the rated current $I_{act}$ is well matched to the actual temperature $T_{act}$. The maximum permissible ambient temperature $T_{ZMU}$ is in this case the ambient temperature in which the respective motor can just still be operated. There is no need to record the maximum permissible ambient temperature $T_{ZMU}$ as an appliance-specific variable before calculation of the rated current $I_{act}$. In addition, a user can himself use the correction factor C to determine the extent to which he will make his rated-current calculation dependent on the recording of the actual temperature $T_{act}$. If correct recording of a measurement-relevant actual temperature $T_{act}$ can be assumed then it is worthwhile choosing a value of $\leq 1$ for the correction factor C. If the user in this way assumes that a value which is not well suited to determination of the rated current is being recorded in the recording of the actual temperature $T_{act}$, then it is worthwhile choosing a value which tends to zero for the correction factor.

In addition, the rated-current basic value $I_{rated}$ can be matched to the actual rotation speed n of the motor. In a further method step, the rated-current basic value $I_{rated}$ which has been matched to the actual rotation speed can then also be matched to the actual temperature $T_{act}$. The value calculated using this method ensures greater protection against overheating of the motor, when it is used to calculate the load level on a motor.

The method described above can also be used for a measurement system for determination of the load level on a motor and/or for a measurement system for temperature monitoring of a motor.

BRIEF DESCRIPTION OF THE DRAWING

The present invention will now be explained in more detail with reference to the attached drawings, in which.

DETAILED DESCRIPTION OF PREFERRED EMBODIMENTS

The exemplary embodiments which are described in more detail in the following text represent preferred embodiments of the present invention.

Figure 1:
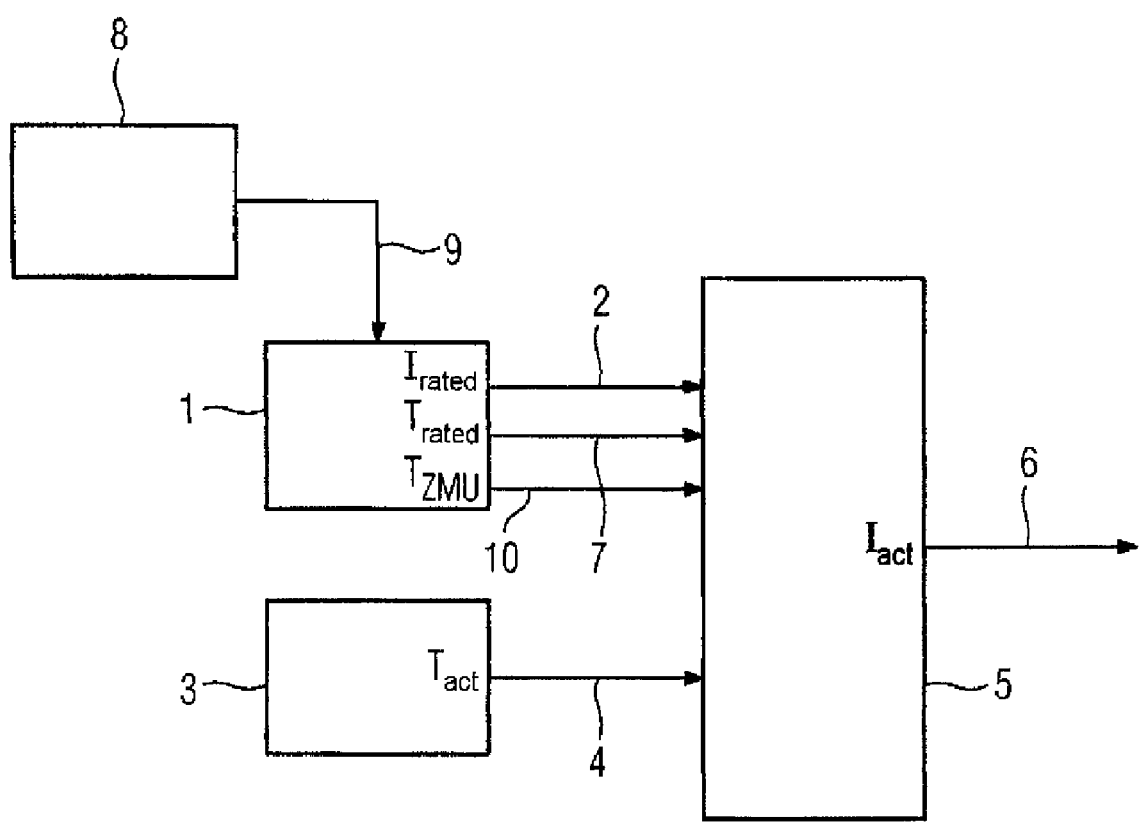
FIG. 1 shows an apparatus according to the invention for determination of a rated current.

FIG. 1 shows an apparatus according to the invention for determination of a rated current for a motor, having an output device 1, a sensor device 3, a rotation-speed recording device 8 and an evaluation device 5.

The rotation-speed recording device 8 is arranged within the motor such that it can record the rotation speed n of the motor, although this is not illustrated in FIG. 1, for clarity reasons. The rotation-speed recording device 8 emits a rotation-speed signal 9 to the output device 1 as a function of the recorded rotation speed n.

The output device 1 associates a specific rated-current basic value $I_{rated}$ with the rotation-speed signal 9, and emits an appropriate rated-current basic-value signal 2 to the evaluation device 5. In addition, the output device 1 also emits a rated-current temperature signal 7, as a function of the temperature value at which the rated-current basic value $I_{rated}$ was determined, and a permissibility temperature signal 10 as a function of the maximum permissible ambient temperature $T_{ZMU}$, to the evaluation device 5.

The sensor device 3 is arranged such that it records a temperature of the motor. This is ensured if the sensor device 3 is arranged within the motor housing, as is the case in the example shown in FIG. 1. The sensor device 3 then emits a temperature signal 4 to the evaluation device 5, as a function of a recorded actual temperature $T_{act}$. Alternatively or additionally, the sensor device can also record the temperature adjacent to or outside of the motor housing as the ambient temperature $T_{act}$.

The evaluation device 5 uses the rated-current basic-value signal 2, the rated-current temperature signal 7 and the temperature signal 4 to calculate a rated current $I_{act}$. In the example shown in FIG. 1, this is done using the already mentioned equations 4 to 6, with the value 1 being set for the correction factor C. Finally, the evaluation device 5 emits a rated-current signal 6 as a function of the calculated rated current $I_{act}$.

Figure 2:
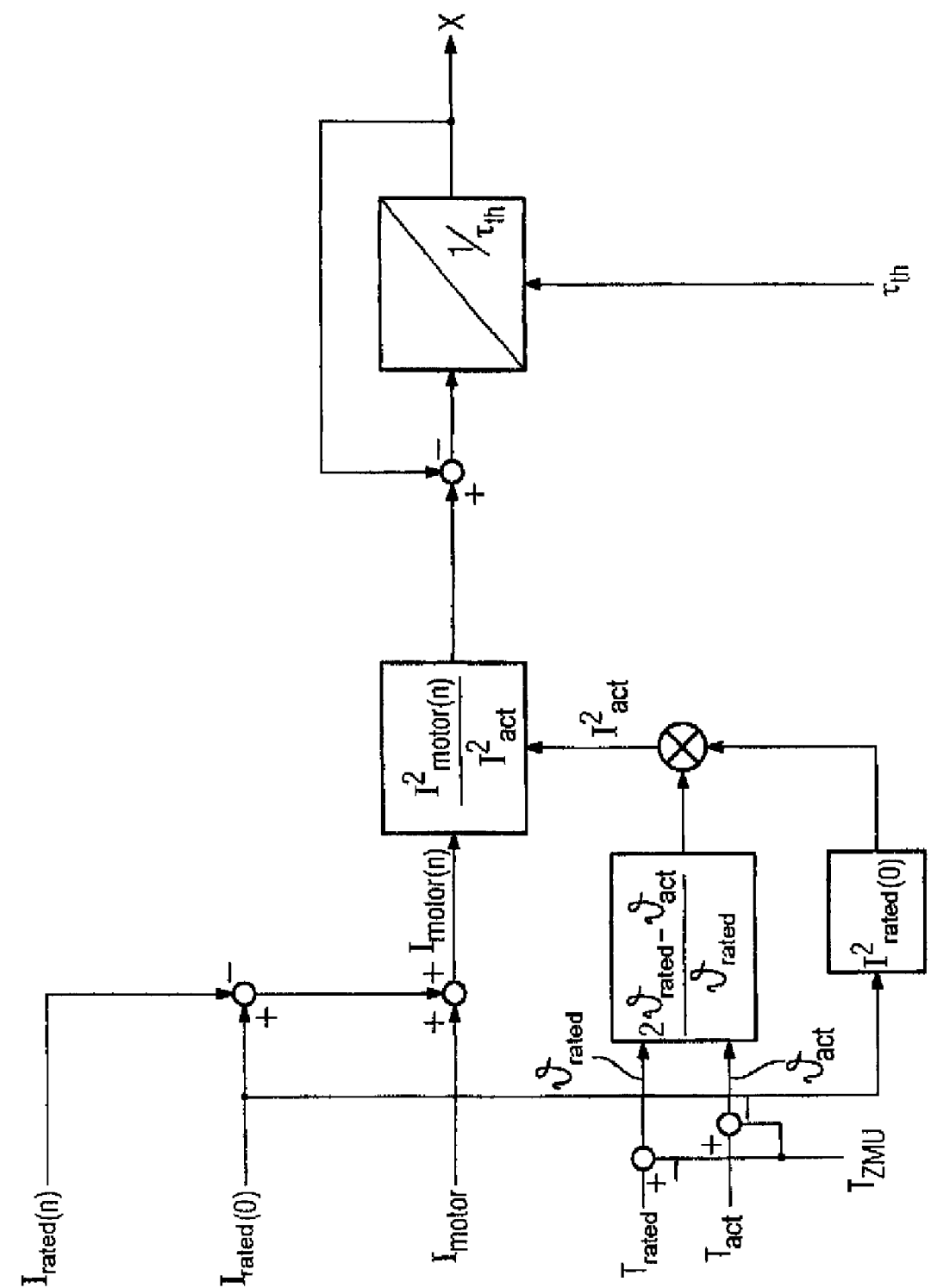
FIG. 2 shows a method according to the invention for calculation of a load level on a motor.

FIG. 2 shows a method according to the invention for calculation of the load level on a motor. In this case, the method illustrated in FIG. 2 relates to the calculation steps which are carried out by the evaluation device 5.

Before the method as sketched in FIG. 2 is started, the output device 1 emits an appropriate rated-current signal 6 to the evaluation device 5 for a rotation-speed signal 9 provided by the rotation-speed recording device 8. In this case, the rated-current signal 6 is used to transmit to the evaluation device 5 a rated-current basic value $I_{rated}(n)$ for the rotation speed n as recorded by the rotation-speed recording device 8, and a rated-current basic value $I_{rated}(0)$ when the motor is stationary. In addition, the output device 1 emits a rated-current temperature signal 7, which corresponds to the rated-current temperature $T_{rated}$, and a permissibility temperature signal 10 as a function of the maximum permissible ambient temperature $T_{ZMU}$, to the evaluation device 5. A motor-current recording device records the motor current level $I_{motor}$ supplied to the motor, and passes an appropriate motor-current signal to the evaluation device 5. The sensor device 3 records the temperature $T_{act}$, and passes a temperature signal 4 for this to the evaluation device 5.

As sketched in FIG. 2, the evaluation device 5 determines the load level X on the motor. First of all, the evaluation device 5 calculates the difference between the two rated-current basic values $I_{rated}(0)$ and $I_{rated}(n)$. The value calculated in this case is then added to the recorded motor current level $I_{motor}$, in order to correct the motor current level $I_{motor}$ for the rotation speed n of the motor. The motor current level $I_{motor}(n)$ which has been corrected for the rotation speed n is calculated using the following equation 7:

$$I_{motor}(n) = I_{motor} + I_{rated}(0) - I_{rated}(n) \quad \text{(Equation 7)}$$

Furthermore, the evaluation device 5 calculates the difference $\sigma_{rated}$ between the actual temperature $T_{rated} T_{act}$ and the maximum permissible ambient temperature $T_{ZMU}$, as well as the difference $\sigma_{act}$ between the rated-current temperature $T_{act}$ and the maximum permissible ambient temperature $T_{ZMU}$. This is done using the already mentioned equations 4 and 5:

$$\sigma_{rated} = T_{rated} - T_{ZMU} \quad \text{(Equation 4)}$$

$$\sigma_{act} = T_{act} - T_{ZMU} \quad \text{(Equation 5)}$$

The value $\sigma_{rated}$ obtained using equation 4 is then multiplied by the factor 2, and the value $\sigma_{act}$ obtained using equation 5 is subtracted from this. The difference calculated in this way is divided by the value $\sigma_{rated}$ from equation 4.

The result is multiplied by the square of the rated-current basic value for a rotation speed equal to zero $I^2_{rated}(0)$. In this case, the square of the rated current $I^2_{act}$, matched to the temperature $T_{act}$, is obtained using the following relationship:

$$I^2_{act} = I^2_{rated}(0) \frac{2\vartheta_{rated} - \vartheta_{act}}{\vartheta_{rated}}$$ (Equation 8)

Equation 8 can be derived from the already mentioned equation 6 by substitution of the value 1 for the correction factor C. In the example shown in FIG. 2, this is justified because the ambient temperature $T_{act}$ is recorded correctly because the sensor device is fitted well.

In a further step, the quotient of the square of the motor current level $I^2_{motor}(n)$ corrected for the rotation speed n and of the square of the rated current $I^2_{act}$ determined for that temperature is calculated. The result may be interpreted as an approximation for the load level X for a constant motor current level.

$$X_{con} = \frac{I^2_{motor}(n)}{I^2_{act}}$$ (Equation 9)

If the motor current level is not constant over time, then it is recommended that the calculation steps described above be repeated at regular time intervals $\Delta t$. In addition, the thermal time constant $\tau_{th}$ should then also be taken into account in the calculation of the load level X.

If the actual load level is $X(t+\Delta t)$, this results in the following equation 10:

$$X(t) = \left( \frac{I^2_{motor}(n)}{I^2_{act}} - X(t-1) \right) \frac{\Delta t}{\tau_{th}} + X(t-1)$$ (Equation 10)

As soon as a value of 100% or more is determined for the load level X, remedial measures are taken to prevent overheating of the motor. Examples of this are the emission of a warning signal to a user, the reduction in the motor current level to, for example, 90% of the rated current $I_{rated}$, or automatic shutdown of the motor.

If, in contrast, a value which is considerably less than 100% is determined for the load level X, then the motor current level can be slightly increased without any need to be concerned about overheating of the motor. The method described in the present invention can thus also be used for better utilization of motors than is possible according to the previous prior art.

What is claimed is:

1. A method for variation of a rated current which is specific for a motor, comprising the steps of:
   providing a rated-current basic-value signal as a function of a rated-current basic value of the motor;
   ascertaining an actual temperature;
   generating a temperature signal in response to the actual temperature;
   determining an actual rated current as a function of the rated-current basic-value signal and of the temperature signal; and
   generating a rated-current signal in response to the actual rated current.

2. The method of claim 1, further comprising the step of ascertaining a temperature within a housing or a housing temperature of the motor as the actual temperature $T_{act}$.

3. The method of claim 1, wherein the rated-current basic value is defined for a specific rated-current temperature, and wherein the actual rated current is determined as a function of the rated-current temperature.

4. The method of claim 3, further comprising the step of determining the actual rated current on the basis of the rated-current basic value, the actual temperature, the rated-current temperature, a maximum permissible ambient temperature or a coolant temperature, and a correction factor for a temperature influence using $$\vartheta_{rated} = T_{rated} - T_{ZMU}$$

and $$\vartheta_{act} = T_{act} - T_{ZMU}$$

using $$I_{act} = \sqrt{1 + C \frac{\vartheta_{rated} - \vartheta_{act}}{\vartheta_{rated}}} \, I_{rated}.$$

5. The method of claim 1, wherein the rated-current basic value is matched to the actual rotation speed of the motor.

6. An apparatus for variation of a rated current which is specific for a motor, comprising:
   an output device for providing a rated-current basic-value signal as a function of a rated-current basic value of the motor;
   a sensor device for ascertaining an actual temperature and generating a corresponding temperature signal; and
   an evaluation device having an input side which is coupled to an output of the output device and to an output of the sensor device, for supplying the rated-current basic-value signal and the temperature signal in order to determine an actual rated current as a function of the rated-current basic-value signal and the temperature signal and to provide a corresponding rated-current signal.

7. The apparatus of claim 6, wherein the output device is constructed to deliver a rated-current temperature which is associated with the rated-current basic value to the evaluation device via a rated-current temperature signal, and wherein the evaluation device is constructed to determine the actual rated current on the basis of the rated-current basic value, the actual temperature, the rated-current temperature, a maximum permissible ambient temperature or coolant temperature, and a correction factor for a temperature influence using $$\vartheta_{rated} = T_{rated} - T_{ZMU}$$

and $$\vartheta_{act} = T_{act} - T_{ZMU}$$

using $$I_{act} = \sqrt{1 + C \frac{\vartheta_{rated} - \vartheta_{act}}{\vartheta_{rated}}} \, I_{rated}.$$

8. The apparatus of claim 6, further comprising a rotation-speed recording device, which ascertains a rotation speed of the motor and provides a corresponding rotation-speed signal to the output device, wherein the output device is constructed to provide a rated-current basic-value signal, which is matched to the rotation-speed signal, to the evaluation device.

9. A measurement system for determination of the load level on a motor, comprising an apparatus which includes an output device for providing a rated-current basic-value signal as a function of a rated-current basic value of the motor, a sensor device for ascertaining an actual temperature and generating a corresponding temperature signal, and an evaluation device having an input side which is coupled to an output of the output device and to an output of the sensor device, for supplying the rated-current basic-value signal and the temperature signal in order to determine an actual rated current as a function of the rated-current basic-value signal and the temperature signal and to provide a corresponding rated-current signal.

10. A measurement system for temperature monitoring of a motor, comprising an apparatus which includes an output device for providing a rated-current basic-value signal as a function of a rated-current basic value of the motor, a sensor device for ascertaining an actual temperature and generating a corresponding temperature signal, and an evaluation device having an input side which is coupled to an output of the output device and to an output of the sensor device, for supplying the rated-current basic-value signal and the temperature signal in order to determine an actual rated current as a function of the rated-current basic-value signal and the temperature signal and to provide a corresponding rated-current signal.

* * * * *